United States Patent
Lee et al.

(10) Patent No.: US 8,122,647 B2
(45) Date of Patent: Feb. 28, 2012

(54) POWER TRANSMISSION TOWER

(75) Inventors: Won-Kyo Lee, Daejeon (KR); Dong-Il Lee, Daejeon (KR); Koo-Yong Shin, Daejeon (KR); In-Hyuk Choi, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 323 days.

(21) Appl. No.: 12/585,483

(22) Filed: Sep. 16, 2009

(65) Prior Publication Data
US 2010/0064598 A1    Mar. 18, 2010

(30) Foreign Application Priority Data
Sep. 17, 2008   (KR) .................. 10-2008-0091313

(51) Int. Cl.
 *E04H 12/08* (2006.01)
 *E04H 12/24* (2006.01)
 *H02G 7/00* (2006.01)
(52) U.S. Cl. ........ 52/40; 52/651.01; 52/651.02; 174/44; 174/45 R
(58) Field of Classification Search ......... 52/40, 651.01, 52/651.02, 651.03, FOR. 152, FOR. 153; 174/40 R, 41, 42, 43, 44, 45 R, 45 TD, 40 CC, 174/40 TD; D25/126, 127; *E04H 12/02, E04H 12/08, 12/24; H02G 7/20*
See application file for complete search history.

(56) References Cited

U.S. PATENT DOCUMENTS

| | | | | | |
|---|---|---|---|---|---|
| 253,643 | A | * | 2/1882 | Turner | 174/45 R |
| 282,489 | A | * | 8/1883 | Breen | 174/45 R |
| 1,078,201 | A | * | 11/1913 | Hoybrook | 248/68.1 |
| 2,099,671 | A | * | 11/1937 | Bairey | 343/721 |
| 2,587,587 | A | * | 3/1952 | Bellezza et al. | 174/140 R |
| D197,648 | S | * | 3/1964 | Dreyfuss | D25/127 |
| 3,176,061 | A | * | 3/1965 | Montegani et al. | 174/40 R |
| 4,314,434 | A | * | 2/1982 | Meisberger | 52/651.02 |

FOREIGN PATENT DOCUMENTS

| | | | |
|---|---|---|---|
| CN | 201433592 Y | * | 3/2010 |
| DE | 4413688 A1 | * | 10/1995 |
| DE | 102005009844 A1 | * | 9/2006 |
| JP | 54004394 A | * | 1/1979 |
| JP | 05268713 A | * | 10/1993 |
| JP | 06038351 A | * | 2/1994 |
| JP | 2008025317 A | * | 2/2008 |
| RU | 2014697 C1 | * | 6/1994 |
| SU | 898025 B | * | 1/1982 |
| SU | 1352027 A | * | 11/1987 |

* cited by examiner

*Primary Examiner* — David Dunn
*Assistant Examiner* — Joseph J Sadlon
(74) *Attorney, Agent, or Firm* — McDermott Will & Emery LLP

(57) ABSTRACT

Disclosed is a power transmission tower, which includes a tower body; first through sixth main insulation arms connected by one end thereof to the tower body with an angle with the tower body, respectively, and arranged radially and symmetrically about the tower body in a longitudinal direction; and first through eighth auxiliary insulation arms for selectively connecting the other end of the first through sixth main insulation arms and the tower body so that each of the auxiliary insulation arms constitutes each side of an octagon. Since the insulation arms are octagonally arranged, it is possible to reinforce a mechanical strength and enhance electric properties of the tower.

9 Claims, 4 Drawing Sheets

POWER TRANSMISSION TOWER

The present invention claims priority of Korean Patent Application No. 10-2008-0091313, filed on Sep. 17, 2008, which is incorporated herein by reference.

BACKGROUND OF THE INVENTION

1. Field of the Invention

The present invention relates to a steel tower, and more particularly, to a power transmission tower.

2. Description of Related Art

A power transmission tower refers generally to a tower made of steel frame or steel reinforced frame for supporting power transmission lines. In the power transmission tower, a tower body of metal material is in contact with the earth. In order to insulate the power transmission line from the earth, an arm is used to maintain a clearance between the power transmission line and the tower body. Since the arm is made of a metal material, an insulator of porcelain material is used to insulate the arm from the power transmission line.

FIG. 1 shows a conventional tower for two coupled three-phase power transmission. Referring to FIG. 1, in a conventional tower for two coupled three-phase power transmission, arms 2 of metal material for supporting two coupled three-phase power transmission lines 4 are installed to the tower body 1. The arms 2 are disposed in the tower body 1 in consideration of ensuring of clearances between the power transmission line 4 and the tower body 1 and between the power transmission lines 4. To insulate the arm 2 from the power transmission line 4, an insulator 3 is installed at a tip of the arm 2 and the power transmission line 4 is hung on the tip of the insulator 3. On an upper end of the tower body 1, an arm 5 for supporting an overhead earth wire 6 is installed.

The conventional tower for the two coupled three-phase power transmission has an enlarged structure for supporting tension of the power transmission line since it is mainly used to cross over a valley or a river having a long span. Therefore, it is difficult to install the conventional power transmission tower in a place such as a downtown area where an area of a land under the power transmission is narrow.

To miniaturize the power transmission tower is to replace the arm of metal material with an arm of polymer material having high insulation function. As a polymer composite material having an insulation function exceeding a mechanical strength of metal is developed with development of polymer material and forming technology, a composite insulator using Fiber glass Reinforced Plastic (FRP) has become able to replace the arm of metal material.

FIG. 2 shows a conventional delta shaped compact tower. Referring to FIG. 2, in a conventional delta shaped compact tower, main insulation arms 9 for supporting two coupled three-phase power transmission lines 11 are installed to the tower body 8. Supporting forces of the main insulation arms 9 is reinforced by auxiliary insulation arm 10 connected to the tower body 8 in correspondence to the main insulation arms 9 respectively. A pair of the main insulation arm 9 and the auxiliary arm 10 forms a delta shape. On an upper end of the tower body 8, an arm 13 for supporting an overhead earth wire 12 is installed.

The conventional delta shaped compact tower is advantageous in miniaturization and light weight of the tower since it is possible to reduce the clearance between the arm and the tower body and lower a height of the tower by the length of the insulator installed on the arm of metal material as compared to the case of using the arm of metal material, but requires reinforcement of the supporting force on the main insulation arm and improvement in electrical properties of the tower itself.

SUMMARY OF THE INVENTION

Embodiments of the present invention are directed to a power transmission tower having an octagonal insulation arm arrangement for enhancing a mechanical strength and electrical properties.

Also, embodiments of the present invention are directed to a power transmission tower capable of supporting the octagonal insulation arm for reinforcing the mechanical strength to load.

To achieve the object of the present invention, the present invention provides a power transmission tower, which includes a tower body; first through sixth main insulation arms connected by one end thereof to the tower body with an angle with the tower body, respectively, and arranged radially and symmetrically about the tower body in a longitudinal direction; and first through eighth auxiliary insulation arms for selectively connecting the other end of the first through sixth main insulation arms and the tower body so that each of the auxiliary insulation arms constitutes each side of an octagon.

Preferably, the first through sixth main insulation arms and first through eighth auxiliary insulation arms are made of material containing Fiber glass Reinforced Plastic (FRP).

Preferably, the tower body includes an arm for an overhead earth wire; a ninth auxiliary insulation arm for connecting the overhead earth wire to the other end of the first main insulation arm; and a tenth auxiliary insulation arm for connecting the overhead earth wire to the other end of the sixth main insulation arm.

Preferably, the angle is 45° or multiple of 45°.

Further, the present invention provides a power transmission tower, which includes a tower body provided with a hub fitting and first through fourth fixing fittings; first through sixth main insulation arms connected by one end thereof to the tower body with an angle with the tower body, respectively, and arranged radially and symmetrically about the tower body in a longitudinal direction; first through sixth connection fittings connected correspondingly to the other ends of the first through sixth main insulation arms, respectively; and first through eighth auxiliary insulation arms for selectively connecting first through sixth connection fittings and first through fourth fixing fittings so that each of the auxiliary insulation arms constitutes each side of an octagon.

In accordance with the present invention, since the insulation arms are octagonally arranged, it is possible to obtain miniaturization and light weight of the power transmission tower. Therefore, since a small area for a power transmission route is required, it is possible to establish the power transmission tower in a place where an area of power transmission route is narrow, such as a downtown area where it has been difficult to establish the power transmission tower.

Also, since the insulation arms are octagonally arranged, it is possible to reinforce a mechanical strength and enhance electric properties of the tower.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
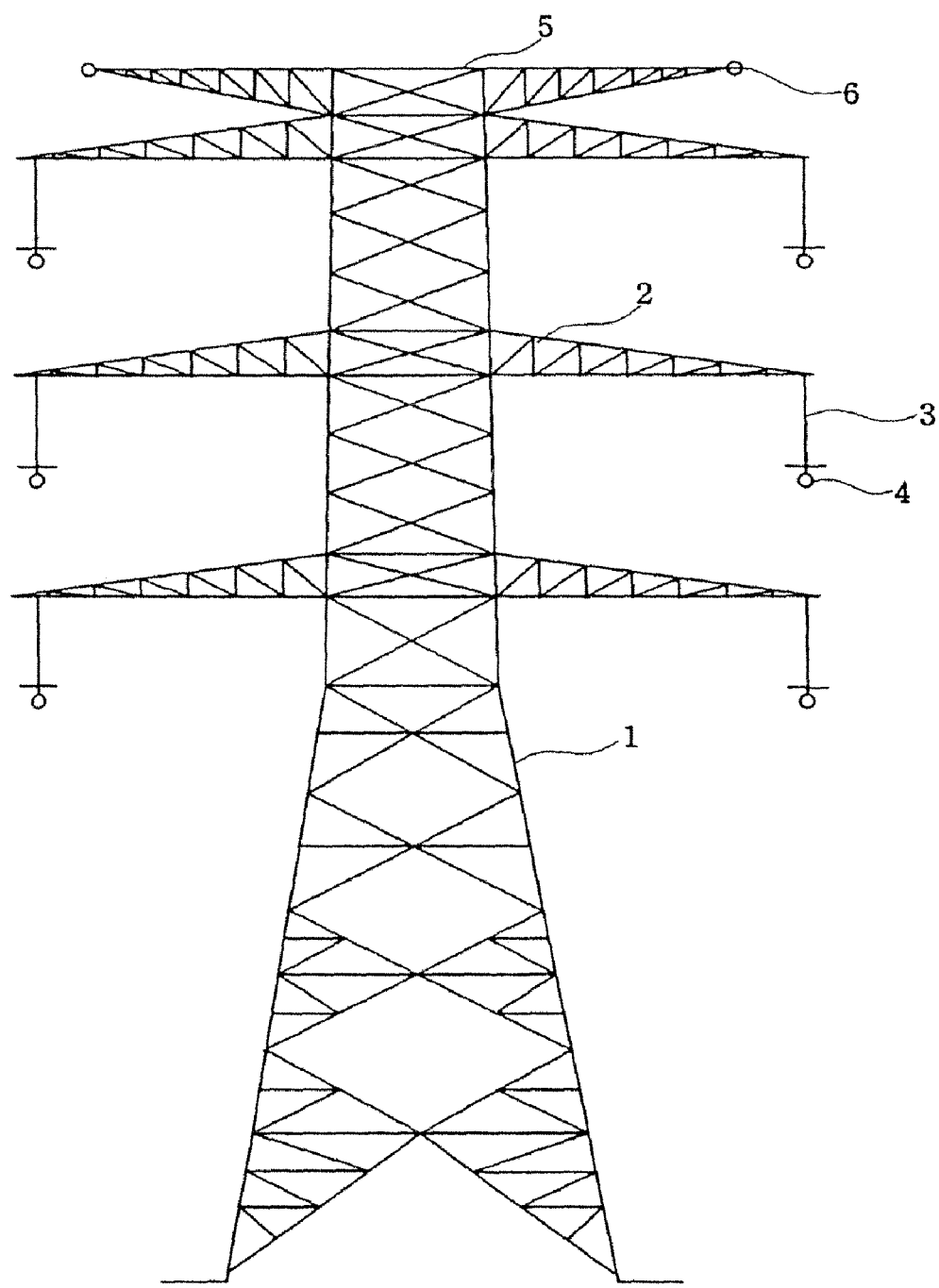
FIG. 1 shows a conventional tower for two coupled three-phase power transmission.
Figure 2:
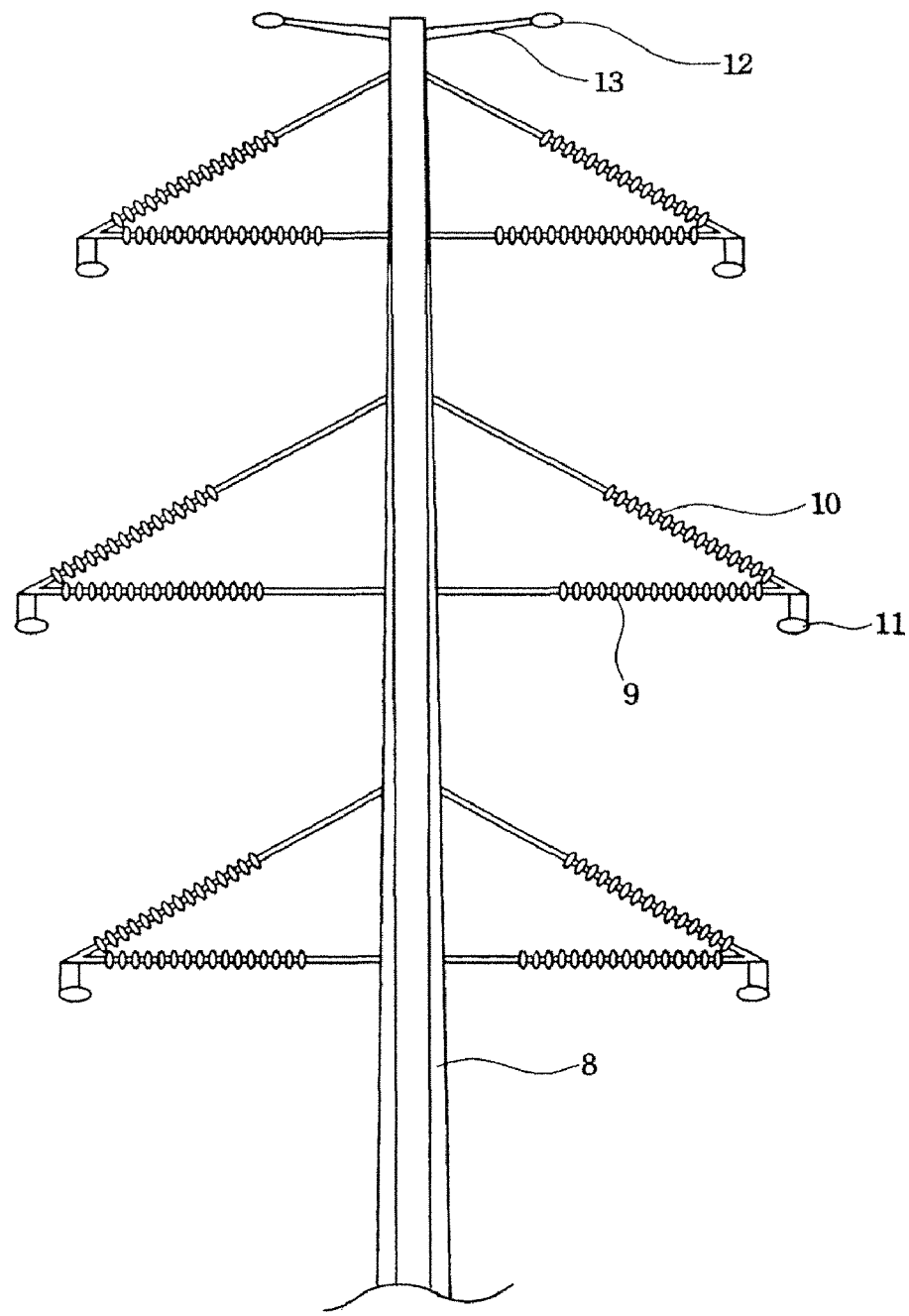
FIG. 2 shows a conventional delta shaped compact tower.
Figure 3:
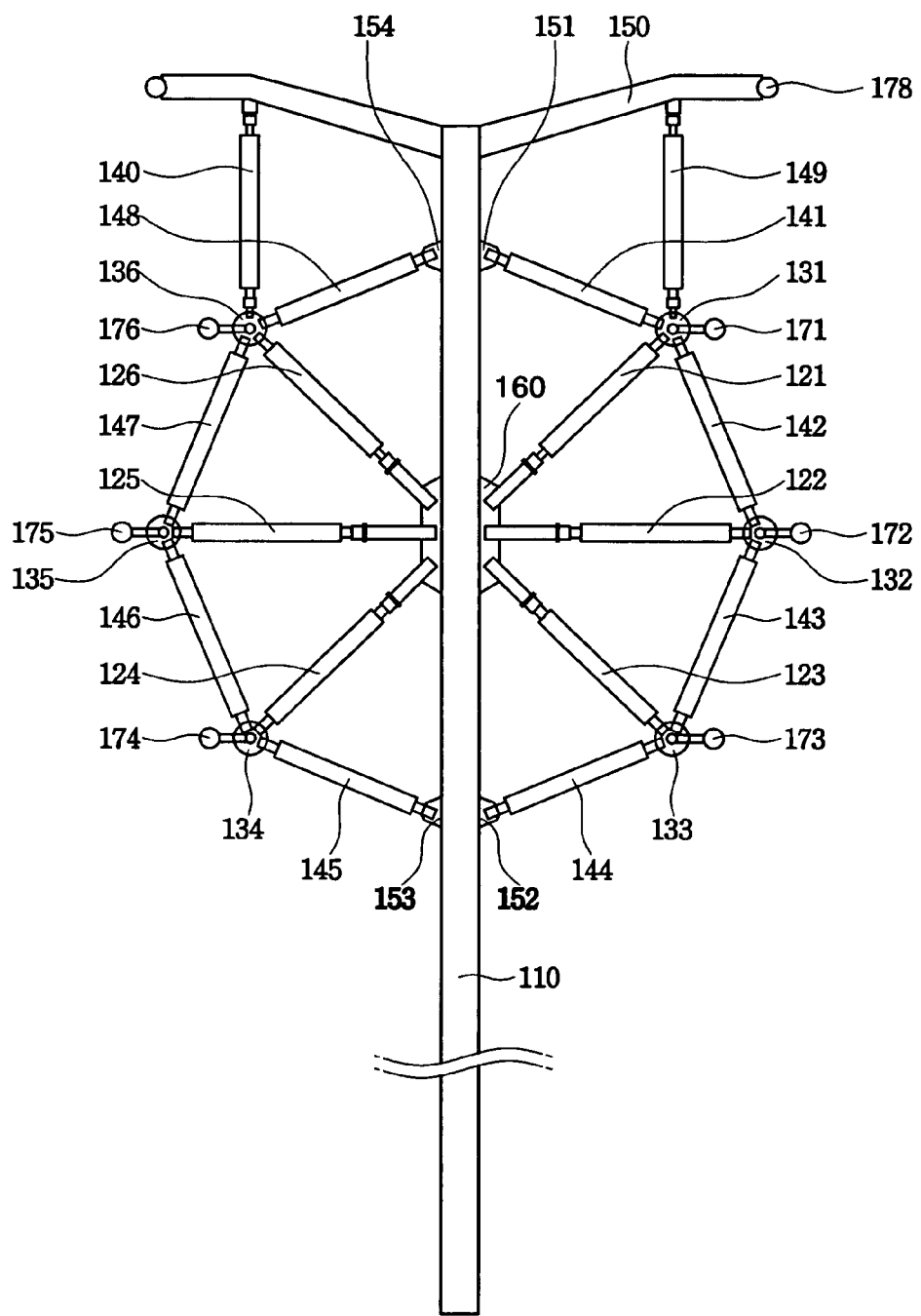
FIG. 3 shows a power transmission tower in accordance with an embodiment of the present invention.

FIG. 3 shows a power transmission tower in accordance with an embodiment of the present invention. Referring to FIG. 3, a power transmission tower in accordance with an embodiment of the present invention includes a tower body 110, an arm 150 for an overhead earth wire, first through sixth main insulation arms 121~126, first through sixth connection fittings 131~136 and first through tenth auxiliary insulation arms 140~149.

The tower body 110 has a steel pipe structure and is provided with a hub fitting 160 and first through fourth fixing fittings 151~154. In the hub fitting 160, insertion holes into which the first through sixth main insulation arms 121~126 are fixedly inserted, respectively may be formed. The first through fourth fittings 151~154 are connected to one ends of the first, fourth, fifth and eighth auxiliary insulation arms 141, 144, 145, 148 respectively.

The first and fourth fittings 151, 154 and the second and third fittings 152, 153 is spaced apart from the hub fitting 160, and are symmetrically installed above and below the hub fitting 160. The first fitting 151 and the fourth fitting 154 are installed symmetrically about the tower body 110 in a longitudinal direction, and the second fitting 152 and the third fitting 153 are installed symmetrically about the tower body 110 in the longitudinal direction. Clearance between the first and fourth fittings 151, 154 and the hub fitting 160, and the second and the third fittings 152, 153 and the hub fitting 160 may correspond to a length of the first through sixth main insulation arms 121~126.

On an upper end of the tower body 110, the arm 150 for an overhead earth wire may be installed with a T shape. The arm 150 for an overhead earth wire is an arm of metal material, and an overhead earth wire 178 may be hung on a tip of the arm 150.

The first through sixth main insulation arms 121~126 support two coupled three-phase power transmission line, respectively, and one end thereof is connected to the hub fitting 160 with an angle with the tower body 110 in a longitudinal direction. The first through sixth main insulation arms 121~126 are radially symmetrically arranged about the tower body 110 in a longitudinal direction. On the ends of the first through sixth main insulation arms 121~126, two coupled three-phase power transmission lines 171~176 are hung by medium of the first through sixth connection fittings 131~136, respectively.

More specifically, the first main insulation arm 121 and the sixth main insulation arm 126 are placed symmetrically about the tower body 110 in a longitudinal direction and are connected to the hub fitting 160 so that the other ends thereof are oriented towards an upper direction of the hub fitting 160. An angle between the first and sixth main insulation arms 121, 126 and the tower body 110 is about 45°. The second main insulation arm 122 and the fifth main insulation arm 125 are placed symmetrically about the tower body 110 in a longitudinal direction and are connected to the hub fitting 160 so that the other ends thereof are oriented towards the horizontal direction of the hub fitting 160. An angle between the second and fifth main insulation arms 122, 125 and the tower body 110 is about 90°. The third main insulation arm 123 and the fourth main insulation arm 124 are placed symmetrically about the tower body 110 in a longitudinal direction and are connected to the hub fitting 160 so that the other ends thereof are oriented towards a lower direction of the hub fitting 160. An angle between the third and fourth main insulation arms 123, 124 and the tower body 110 is about 45°.

The first through sixth connection fittings 131~136 are correspondingly connected to the other ends of the first through sixth main insulation arms 121~126, respectively. Specifically, the first connection fitting 131 is connected to the other end of the first main insulation arm 121, the second connection fitting 132 is connected to the other end of the second main insulation arm 122 and the third connection fitting 133 is connected to the other end of the third main insulation arm 123. The fourth connection fitting 134 is connected to the other end of the fourth main insulation arm 124, the fifth connection fitting 135 is connected to the other end of the fifth main insulation arm 125 and the sixth connection fitting 136 is connected to the other end of the sixth main insulation arm 126.

The first through eighth auxiliary insulation arm 141~148 are the arms maintaining the clearances between two adjacent power transmission lines 171~176, and selectively connect the first through sixth connection fittings 131~136 and the first through fourth fixing fittings 151~154 so that each of the them constitutes each side of the octagon to form entirely the shape of the octagon.

Specifically, the first auxiliary insulation arm 141 is connected between the first fixing fitting 151 and the first connection fitting 131 to connect the tower body 110 and the first main insulation arm 121, the second auxiliary insulation arm 142 is connected between the first connection fitting 131 and the second connection fitting 132 to connect the first main insulation arm 121 and the second main insulation arm 122, the third auxiliary insulation arm 143 is connected between the second connection fitting 132 and the third connection fitting 133 to connect the second main insulation arm 122 and the third main insulation arm 123, and the fourth auxiliary insulation arm 144 is connected between the third connection fitting 133 and the second fixing fitting 152 to connect the third main insulation arm 123 and the tower body 110.

The fifth auxiliary insulation arm 145 is connected between the third fixing fitting 153 and the fourth connection fitting 134 to connect the tower body 110 and the fourth main insulation arm 124, the sixth auxiliary insulation arm 146 is connected between the fourth connection fitting 134 and the fifth connection fitting 135 to connect the fourth main insulation arm 124 and the fifth main insulation arm 125, the seventh auxiliary insulation arm 147 is connected between the fifth connection fitting 135 and the sixth connection fitting 136 to connect the fifth main insulation arm 125 and the sixth main insulation arm 126, and the eighth auxiliary insulation arm 148 is connected between the sixth connection fitting 136 and the fourth fixing fitting 154 to connect the sixth main insulation arm 126 and the tower body 110.

The first through eighth auxiliary insulation arms 141~148 not only maintains the clearances between two adjacent power transmission lines 171~176 but also can perform the function reinforcing the mechanical strength of the first through sixth main insulation arms 121~126.

A conventional delta shaped compact tower has a structure in that one power transmission line is supported by one main insulation arm and one auxiliary insulation arm, but the power transmission tower in accordance with an embodiment of the present invention can have reinforced mechanical strength as compared to the conventional delta shaped compact tower since it has a structure in that the main insulation arms are arranged so as to form an octagonal shape by their ends, the ends of the main insulation arms and the tower body are connected by the auxiliary insulation arms and thus one power transmission line is supported by one main insulation arm and two auxiliary insulation arms. Also, the two coupled three-phase power transmission lines 171~176 can be arranged with maintaining equal clearance from the hub fitting 160 and thus the electrical properties can be improved.

The ninth auxiliary insulation arm 149 connects the arm 150 for an overhead earth wire and the other end of the first main insulation 121, and the tenth auxiliary insulation arm 140 connects the arm 150 for an overhead earth wire and the other end of the sixth main insulation 126. The ninth auxiliary insulation arm 149 and the tenth auxiliary insulation arm 140 functions to reinforce the mechanical strength for the load applied, towards the ground, on the first through sixth main insulation arms 121~126 and the first through eighth auxiliary insulation arms 141~148 constituting the octagon.

The first through sixth main insulation arms 121~126 and the first through eighth auxiliary insulation arms 140~149 can be made of a material containing FRP.

Figure 4:
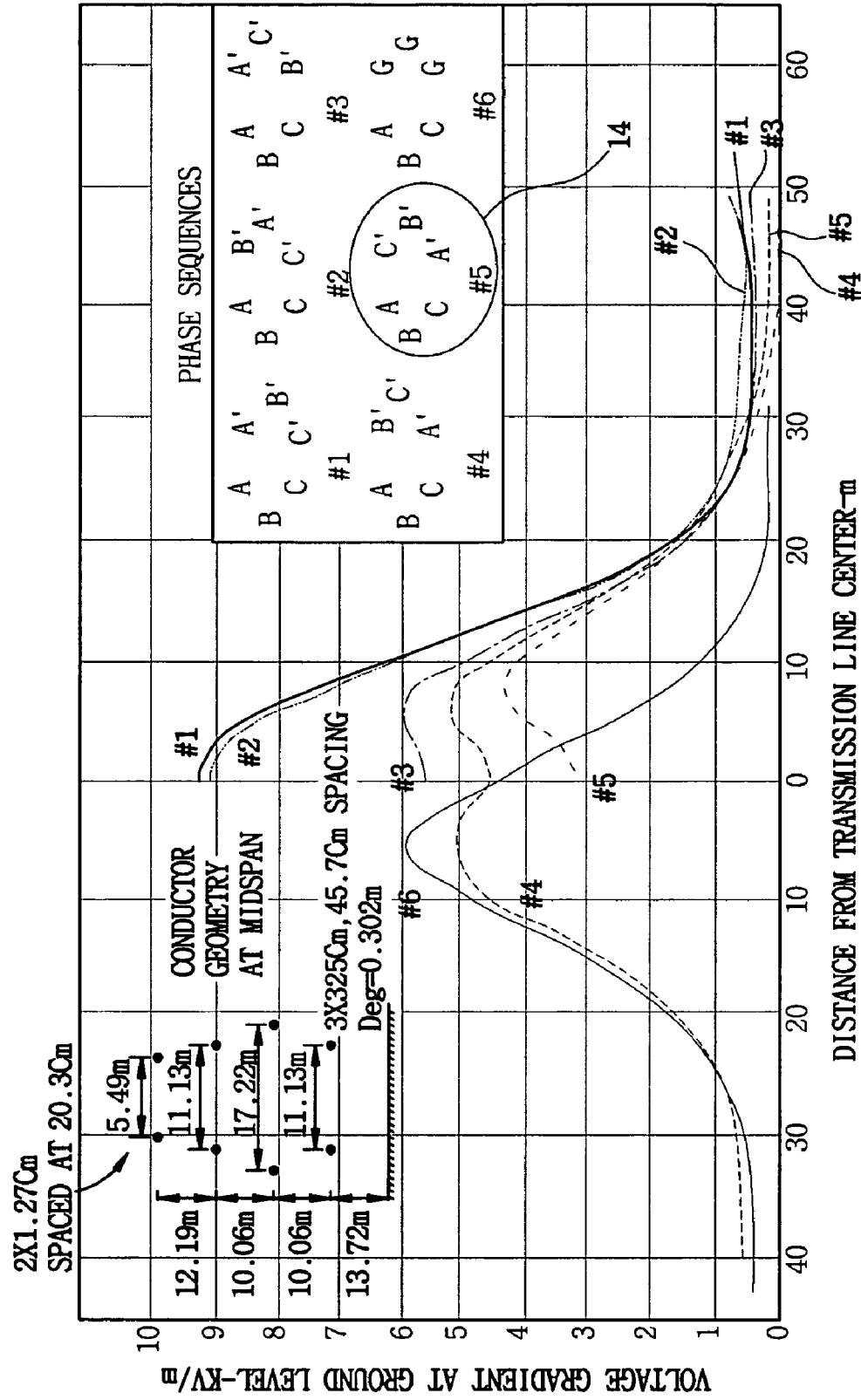
FIG. 4 is a graph showing distribution of electric field according to arrangement of power transmission lines of FIG. 3.

FIG. 4 is a graph showing distribution of electric field according to arrangement of the two coupled three-phase power transmission lines of FIG. 3. Referring to FIG. 4, the two coupled three-phase power transmission lines can be arranged in six phase sequences (#1 through #6). According to the arrangement of the power transmission lines in charge of respective phases, various electrical properties can be shown by interaction between electric fields generated in the power transmission lines of the respective phase.

Among the 6 phase sequence arrangements (#1 through #6), #5 phase sequence arrangement in which the power transmission lines have the reverse phase with respect to each other on the basis of the tower body (phase difference between the power transmission lines is 120° in a counter-clockwise direction from the upper left power transmission line) shows the most reduced electrical properties. Specifically, in the case of #5 phase sequence arrangement, an intensity of the electric field on a land surface just under the power transmission line is lowest in the middle of the power transmission line and is highest in a position placed slightly outwardly from the position just under the lowermost power transmission line. Also, the electric field by the lowermost power transmission line is dominantly shown, and, in the reverse phase arrangement, the electric field becomes lower and the position of the highest electric field is moved towards the middle as is closer to the lowermost power transmission line.

If it is difficult to completely reduce the influence by the electric field generated from the power transmission line on the power transmission tower, it is required to design the power transmission tower so that the influence by the electric field is reduced as is far from the tower. In order to optimize the electric properties so as to lower the intensity of the electric field on the land surface and narrow a space between the highest electric field points, it is required a shape in that the two coupled three-phase power transmission lines are arranged in a reverse phase arrangement on the basis of the power transmission tower and six power transmission lines are arranged circular with the equal spacing. It can be appreciated that the power transmission tower in accordance with an embodiment of the present invention meets this requirement well.

While the present invention has been described with respect to the specific embodiments, it will be apparent to those skilled in the art that various changes and modifications may be made without departing from the spirit and scope of the invention as defined in the following claims.

What is claimed is:

1. A power transmission tower, comprising:
   a tower body;
   first through sixth main insulation arms connected by one end thereof to the tower body at an angle with the tower body, respectively, and arranged symmetrically about the tower body in a longitudinal direction; and
   first through eighth auxiliary insulation arms for selectively connecting the other end of the first through sixth main insulation arms and the tower body so that each of the auxiliary insulation arms constitutes one side of an octagon.

2. The power transmission tower of claim 1, wherein the first through sixth main insulation arms and first through eighth auxiliary insulation arms are made of material containing Fiber glass Reinforced Plastic (FRP).

3. The power transmission tower of claim 1, wherein the tower body includes
   an arm for an overhead earth wire;
   a ninth auxiliary insulation arm connecting the arm to the other end of the first main insulation arm; and
   a tenth auxiliary insulation arm connecting the arm to the other end of the sixth main insulation arm.

4. The power transmission tower of claim 1, wherein the angle is 45° or a multiple of 45°.

5. A power transmission tower, comprising:
   a tower body provided with a hub fitting and first through fourth fixing fittings;
   first through sixth main insulation arms connected by one end thereof to the tower body at an angle with the tower body, respectively, and arranged symmetrically about the tower body in a longitudinal direction;
   first through sixth connection fittings connected correspondingly to the other ends of the first through sixth main insulation arms, respectively; and
   first through eighth auxiliary insulation arms for selectively connecting first through sixth connection fittings and first through fourth fixing fittings so that each of the auxiliary insulation arms constitutes one side of an octagon.

6. The power transmission tower of claim 5, wherein the first auxiliary insulation arm is connected between the first fixing fitting and the first connection fitting to connect the tower body and the first main insulation arm;
   the second auxiliary insulation arm is connected between the first connection fitting and the second connection fitting to connect the first main insulation arm and the second main insulation arm;
   the third auxiliary insulation arm is connected between the second connection fitting and the third connection fitting to connect the second main insulation arm and the third main insulation arm;
   the fourth auxiliary insulation arm is connected between the third connection fitting and the second fixing fitting to connect the third main insulation arm and the tower body;
   the fifth auxiliary insulation arm is connected between the third fixing fitting and the fourth connection fitting to connect the tower body and the fourth main insulation arm; the sixth auxiliary insulation arm is connected between the fourth connection fitting and the fifth connection fitting to connect the fourth main insulation arm and the fifth main insulation arm;
   the seventh auxiliary insulation arm is connected between the fifth connection fitting and the sixth connection fitting to connect the fifth main insulation arm and the sixth main insulation arm; and
   the eighth auxiliary insulation arm is connected between the sixth connection fitting and the fourth fixing fitting to connect the sixth main insulation arm and the tower body.

7. The power transmission tower of claim 6, wherein the tower body includes
   an arm for an overhead earth wire,
   a ninth auxiliary insulation arm connecting the arm to the other end of the first main insulation arm; and
   a tenth auxiliary insulation arm connecting the arm to the other end of the sixth main insulation arm.

8. The power transmission tower of claim 5, wherein the angle is 45° or a multiple of 45°.

9. The power transmission tower of claim 7, wherein the first through sixth main insulation arms and first through tenth auxiliary insulation arms are made of material containing Fiber glass Reinforced Plastic (FRP).

* * * * *